(12) United States Patent
Ma

(10) Patent No.: US 11,579,094 B2
(45) Date of Patent: Feb. 14, 2023

(54) MOISTURE SENSING SYSTEM FOR HEATING, VENTILATION AND AIR CONDITIONING SYSTEMS

(71) Applicant: Carrier Corporation, Farmington, CT (US)

(72) Inventor: Zidu Ma, Ellington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 236 days.

(21) Appl. No.: 15/775,666

(22) PCT Filed: Nov. 11, 2016

(86) PCT No.: PCT/US2016/061480
§ 371 (c)(1),
(2) Date: May 11, 2018

(87) PCT Pub. No.: WO2017/083613
PCT Pub. Date: May 18, 2017

(65) Prior Publication Data
US 2018/0328853 A1    Nov. 15, 2018

Related U.S. Application Data

(60) Provisional application No. 62/254,232, filed on Nov. 12, 2015.

(51) Int. Cl.
*G01N 21/81* (2006.01)
*F24F 11/32* (2018.01)
(Continued)

(52) U.S. Cl.
CPC .............. *G01N 21/81* (2013.01); *F24F 11/30* (2018.01); *F24F 11/32* (2018.01); *F24F 11/52* (2018.01); *F24F 2110/00* (2018.01); *G01N 21/85* (2013.01)

(58) Field of Classification Search
CPC ......... G01N 21/81; G01N 21/85; F24F 11/32; F24F 11/30; F24F 11/52; F24F 2110/00
(Continued)

(56) References Cited

U.S. PATENT DOCUMENTS 4,506,521 A * 3/1985 Asano ..................... F25B 41/24
62/238.7
5,123,259 A * 6/1992 Morgan, Sr. ............ F25B 45/00
62/149

(Continued)

FOREIGN PATENT DOCUMENTS

CN           1287250 A        3/2001
CN       202442549 U   *   9/2012
(Continued)

OTHER PUBLICATIONS

Translation DE-20202939-U1 (Year: 2002).*
(Continued)

*Primary Examiner* — Alexander A Mercado
*Assistant Examiner* — Monica S Young
(74) *Attorney, Agent, or Firm* — Cantor Colburn LLP

(57) ABSTRACT

A moisture sensing system for a refrigerant flow of a heating, ventilation and air conditioning (HVAC) system includes a moisture sensor including a color change material sample located in a refrigerant flow of the HVAC system. The color change material sample configured to change color as an indication of a moisture level of the refrigerant flow. A color sensor is in optical communication with the moisture sensor and is configured to sense a color of the color change material and communicate the sensed color to an HVAC system controller. A method of operating an HVAC system includes exposing a condensing a color change material sample to a flow of refrigerant and sensing a color of the color change material via a color sensor. The (Continued)

color is indicative of a moisture level of the flow of refrigerant. The sensed color is communicated to an HVAC system controller.

17 Claims, 2 Drawing Sheets

(51) Int. Cl.
*F24F 11/52* (2018.01)
*F24F 11/30* (2018.01)
*G01N 21/85* (2006.01)
*F24F 110/00* (2018.01)

(58) Field of Classification Search
USPC .................................................. 73/335
See application file for complete search history.

(56) References Cited

U.S. PATENT DOCUMENTS

| | | | | |
|---|---|---|---|---|
| 5,211,024 | A * | 5/1993 | Manz | F25B 45/00 |
| | | | | 62/149 |
| 5,243,831 | A * | 9/1993 | Major | F25B 45/00 |
| | | | | 62/292 |
| 5,341,649 | A * | 8/1994 | Nevitt | F25B 41/006 |
| | | | | 62/126 |
| 5,367,888 | A * | 11/1994 | Muston | B60H 1/00585 |
| | | | | 62/149 |
| 5,720,184 | A | 2/1998 | Olsen | |
| 5,987,912 | A | 11/1999 | Felssner | |
| 6,223,543 | B1 | 5/2001 | Sandelman | |
| 6,260,378 | B1 * | 7/2001 | Sagar | F25B 43/043 |
| | | | | 62/149 |
| 6,576,473 | B1 * | 6/2003 | Scaringe | G01N 21/80 |
| | | | | 422/401 |
| 6,591,629 | B1 * | 7/2003 | Galbreath, Jr. | F25B 45/00 |
| | | | | 62/149 |
| 7,540,187 | B1 | 6/2009 | Dillon | |
| 8,922,379 | B1 | 12/2014 | Meyer | |
| 2004/0194913 | A1 * | 10/2004 | Umebayashi | B60H 1/00692 |
| | | | | 165/204 |
| 2008/0066474 | A1 * | 3/2008 | Porter | F25B 49/005 |
| | | | | 62/127 |
| 2008/0077260 | A1 * | 3/2008 | Porter | F25B 49/005 |
| | | | | 62/129 |
| 2012/0234028 | A1 | 9/2012 | Tanabe et al. | |
| 2013/0153170 | A1 | 6/2013 | Galus | |
| 2013/0186189 | A1 | 7/2013 | Fuhrmann | |
| 2014/0075966 | A1 | 3/2014 | Schmitz et al. | |

FOREIGN PATENT DOCUMENTS

| | | | | |
|---|---|---|---|---|
| CN | 203899426 U | * | 10/2014 | |
| CN | 106403357 A | * | 2/2017 | |
| DE | 20202939 U1 | * | 8/2002 | ............ G01N 21/81 |
| DE | 20202939 U1 | | 8/2002 | |
| EP | 0456977 A2 | * | 11/1991 | ............ G01N 21/81 |
| EP | 0456977 A2 | | 11/1991 | |
| JP | 2012247257 | | 12/2012 | |
| KR | 20100007157 | | 7/2010 | |
| WO | WO-2004053404 A2 | * | 6/2004 | ............ F25B 43/02 |
| WO | WO-2006108056 A1 | * | 10/2006 | ............ F25B 49/025 |

OTHER PUBLICATIONS

Translation EP0456977 (Year: 1991).*
Daikin, "Refrigerant Piping Design Guide"; Application Guide AG 31-011; Daikin; 91 pgs.
Written Opinion for International Application No. PCT/US2016/061480; International Filing Date Nov. 11, 2016; dated Jan. 30, 2017; 5 Pages.
International Search Report for International Application No. PCT/US2016/061480; International Filing Date Nov. 11, 2016; dated Jan. 30, 2017; 5 Pages.
Highbeam, "Sight Glass and Moisture Indicators", High Beam Research, An Online Magazine, Published on Aug. 7, 1995, Chicago, IL, USA, 2 Pages.
Honeywell Engineering Manual of Automatic Control for Commercial Buildings; Copyright 1934, 1940, 1953, 1988, 1991 and 1997 Honeywell Inc.; Retrieved from Internet Oct. 12, 2015; URL: https://customer.honeywell.com/resources/techlit/TechLitDocuments; 518 p (Large Reference Uploaded To USPTO In 3 Parts).
Redi Controls, Inc.; Installation, Operation & Maintenance Manual; Literature File No. 1117-02; Redi-Purge™ Model PRG-113-C3 & C4; Purge Unit for Low Pressure Chillers; Revised Technically as of Oct. 11, 2013; © 1994 Redi Controls, Inc., Greenwood, IN; 68 p.

* cited by examiner

MOISTURE SENSING SYSTEM FOR HEATING, VENTILATION AND AIR CONDITIONING SYSTEMS

CROSS REFERENCE TO RELATED APPLICATIONS

This application is a National Stage application of PCT/US2016/061480, filed Nov. 11, 2016, which claims the benefit of U.S. Provisional Application No. 62/254,232, filed Nov. 12, 2015, both of which are incorporated by reference in their entirety herein.

BACKGROUND

The subject matter disclosed herein relates to heating, ventilation and air conditioning (HVAC) systems. More specifically, the subject matter disclosed herein relates to chillers.

As regulatory & industry trends continue to drive towards replacement of conventional HFC's like R134a, of particular interest are the class of "low pressure refrigerants", i.e. refrigerants that are near, or below atmospheric pressure at the boiling temperatures in a chiller. One example of a "low pressure refrigerants" is R1233zd. Numerous other low pressure refrigerants are known to those of ordinary skill in the art. While low pressure refrigerants have numerous known advantages, they, however, also tend to absorb moisture, which can inhibit chiller performance.

Because the low pressure chiller system operates at below atmospheric pressure, ambient air can intrude into the chiller and, with it, bring moisture, which is absorbed by the refrigerant, thereby degrading chiller performance and potentially causing other problems. The chiller system is typically monitored for moisture level in the refrigerant, and moisture is periodically dried or purged from the chiller system. Chiller systems typically employ a sight glass with a color change material exposed to the refrigerant stream, with the color indicating a moisture level of the refrigerant. This sight glass indicator requires operators of the chiller periodically physically check the sight glass for moisture content of the refrigerant.

BRIEF SUMMARY

In one embodiment, a moisture sensing system for a refrigerant flow of a heating, ventilation and air conditioning (HVAC) system includes a moisture sensor including a color change material sample located in a refrigerant flow of the HVAC system. The color change material sample configured to change color as an indication of a moisture level of the refrigerant flow. A color sensor is in optical communication with the moisture sensor and is configured to sense a color of the color change material and communicate the sensed color to an HVAC system controller.

Additionally or alternatively, in this or other embodiments the moisture sensor is located inside of a sight glass housing.

Additionally or alternatively, in this or other embodiments the color sensor is located outside of the sight glass housing.

Additionally or alternatively, in this or other embodiments the color sensor includes a light emitting diode to illuminate the moisture sensor.

In another embodiment, a heating, ventilation and air conditioning (HVAC) system includes a compressor to compress a flow of refrigerant through a refrigerant pathway, a condenser positioned along the refrigerant pathway and in fluid communication with the compressor, and an evaporator located along the refrigerant pathway and in fluid communication with the compressor and the condenser. A moisture sensing system is located along the refrigerant pathway and includes a moisture sensor including a color change material sample positioned in the refrigerant pathway and exposed to a refrigerant flow therethrough. The color change material sample is configured to change color as an indication of a moisture level of the refrigerant flow. A color sensor is in optical communication with the moisture sensor and is configured to sense a color of the color change material and communicate the sensed color to an HVAC system controller.

Additionally or alternatively, in this or other embodiments the moisture sensor is positioned inside of a sight glass housing.

Additionally or alternatively, in this or other embodiments the color sensor is positioned outside of the sight glass housing.

Additionally or alternatively, in this or other embodiments the color sensor includes a light emitting diode to illuminate the moisture sensor.

Additionally or alternatively, in this or other embodiments the HVAC system controller is configured to take one or more actions based on the sensed color communicated to the HVAC system controller.

Additionally or alternatively, in this or other embodiments the one or more actions include initiating an alarm or warning.

Additionally or alternatively, in this or other embodiments the one or more actions include initiating a refrigerant flow drying or purge operation.

In yet another embodiment, a method of operating a heating, ventilation and air conditioning (HVAC) system includes exposing a condensing a color change material sample to a flow of refrigerant and sensing a color of the color change material via a color sensor. The color is indicative of a moisture level of the flow of refrigerant. The sensed color is communicated to an HVAC system controller.

Additionally or alternatively, in this or other embodiments the color sensor is disposed outside of a sight glass housing.

Additionally or alternatively, in this or other embodiments the color change material sample is illuminated.

Additionally or alternatively, in this or other embodiments one or more actions are initiated via the HVAC system controller based on the sensed color of the color change material sample.

Additionally or alternatively, in this or other embodiments the HVAC system controller initiates an alarm or warning based on the sensed color of the color change material sample.

Additionally or alternatively, in this or other embodiments the HVAC system controller initiates a refrigerant flow drying or purge operation based on the sensed color of the color change material.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Embodiments of low pressure refrigerant chiller systems are disclosed herein. Initially, it should be understood that the term "low pressure refrigerant" defines refrigerant having a liquid phase saturation pressure below about 45 psi (310.3 kPa) at 104° F. (40° C.). An example of low pressure refrigerant includes R1233zd. While the below description references a low pressure refrigerant, it should be understood that the present invention is compatible with any type of chiller system.

Figure 1:
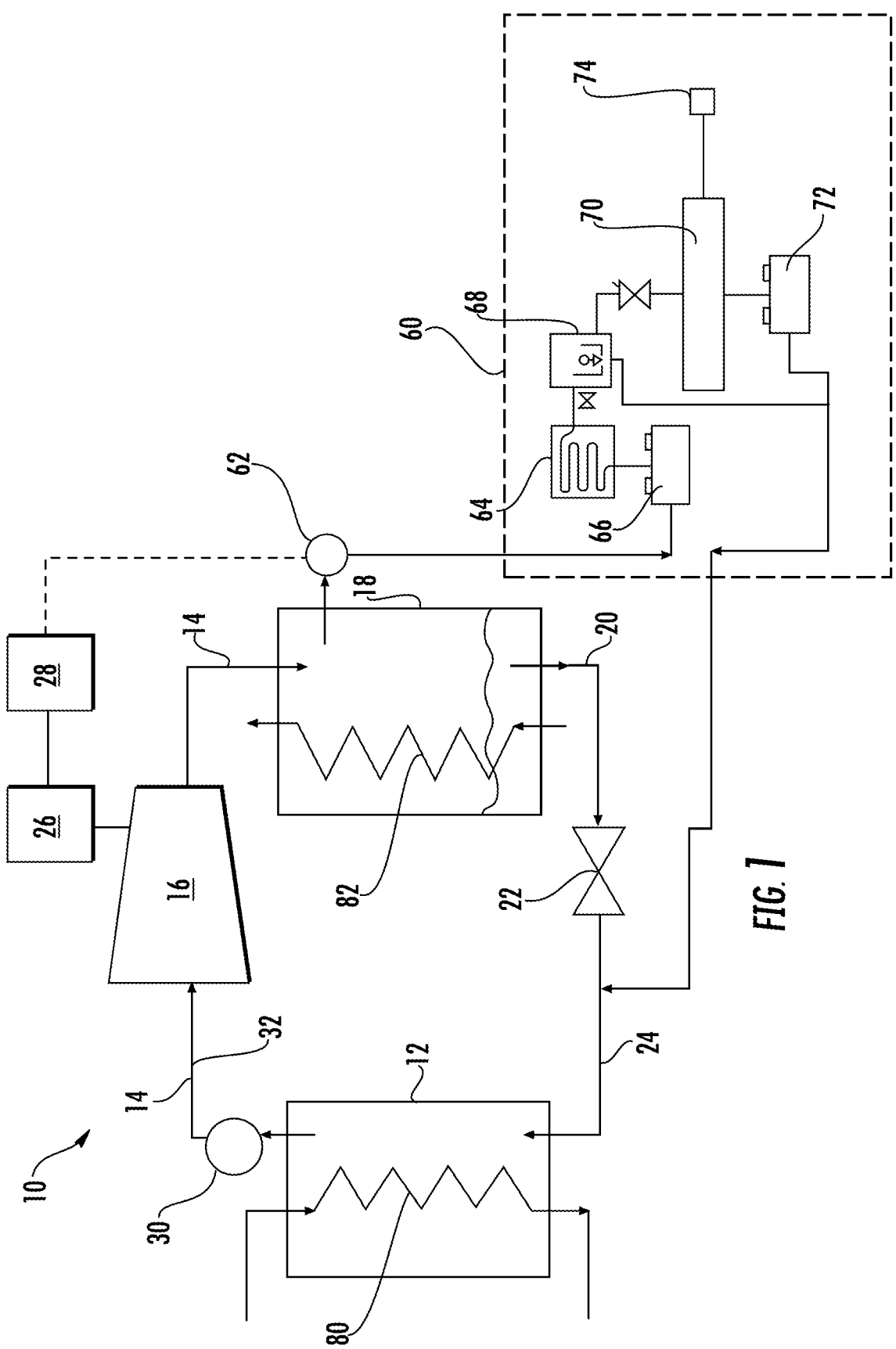
FIG. 1 is a schematic view of an exemplary chiller system.

Shown in FIG. 1 is a schematic view an exemplary embodiment of a heating, ventilation and air conditioning (HVAC) unit, for example, a chiller 10 using an evaporator 12. A flow of vapor refrigerant 14 is directed into a compressor 16 and then to a condenser 18 condensing the refrigerant into a flow of liquid refrigerant 20 via interaction with a flow of cooling water 82. The liquid refrigerant 20 flows through an expansion valve 22. The expansion valve 22 outputs a vapor and liquid refrigerant mixture 24 toward the evaporator 12, which is boiled off in the evaporator 12 via thermal energy exchange with a flow of water 80 through the evaporator 12, which is chilled by the thermal energy exchange. The compressor 16 may be, for example, a screw compressor, reciprocating compressor, scroll compressor, or a centrifugal compressor, and is driven by a prime mover, for example, an electric motor 26, and controlled by a controller 28 operably connected to the compressor 16, in some embodiments via the electric motor 26.

The chiller 10 further includes a moisture sensor 30 located along a refrigerant path 32 of the chiller 10. In the embodiment shown, moisture sensor 30 is located along the refrigerant path 32 between the evaporator 12 and the compressor 16, but in other embodiments the moisture sensor 30 may be located at other locations, for example, between the compressor 16 and the condenser 18 or between the condenser 18 and the evaporator 12.

In some embodiments, the chiller 10 further includes a purge system 60, configured to purge moisture from the refrigerant flow circulating in the refrigerant path 32. In the embodiment illustrated, the mixture of refrigerant and non-condensable gases, such as air, is diverted from the condenser 18 by a purge valve 62, and pumped to a purge condenser 64 by a purge pump 66. The mixture then proceeds to a purge separation chamber 68, where the liquid refrigerant is separated from the gaseous mixture of air and refrigerant. The gaseous mixture proceeds to a carbon tank 70 where the gaseous refrigerant is collected and the air is vented via a vent 74 to ambient. A regenerating pump 72 urges the gaseous refrigerant to the evaporator 12. It is to be appreciated that the purge system 60 is merely an example, and other configurations of such systems may be utilized.

Figure 2:
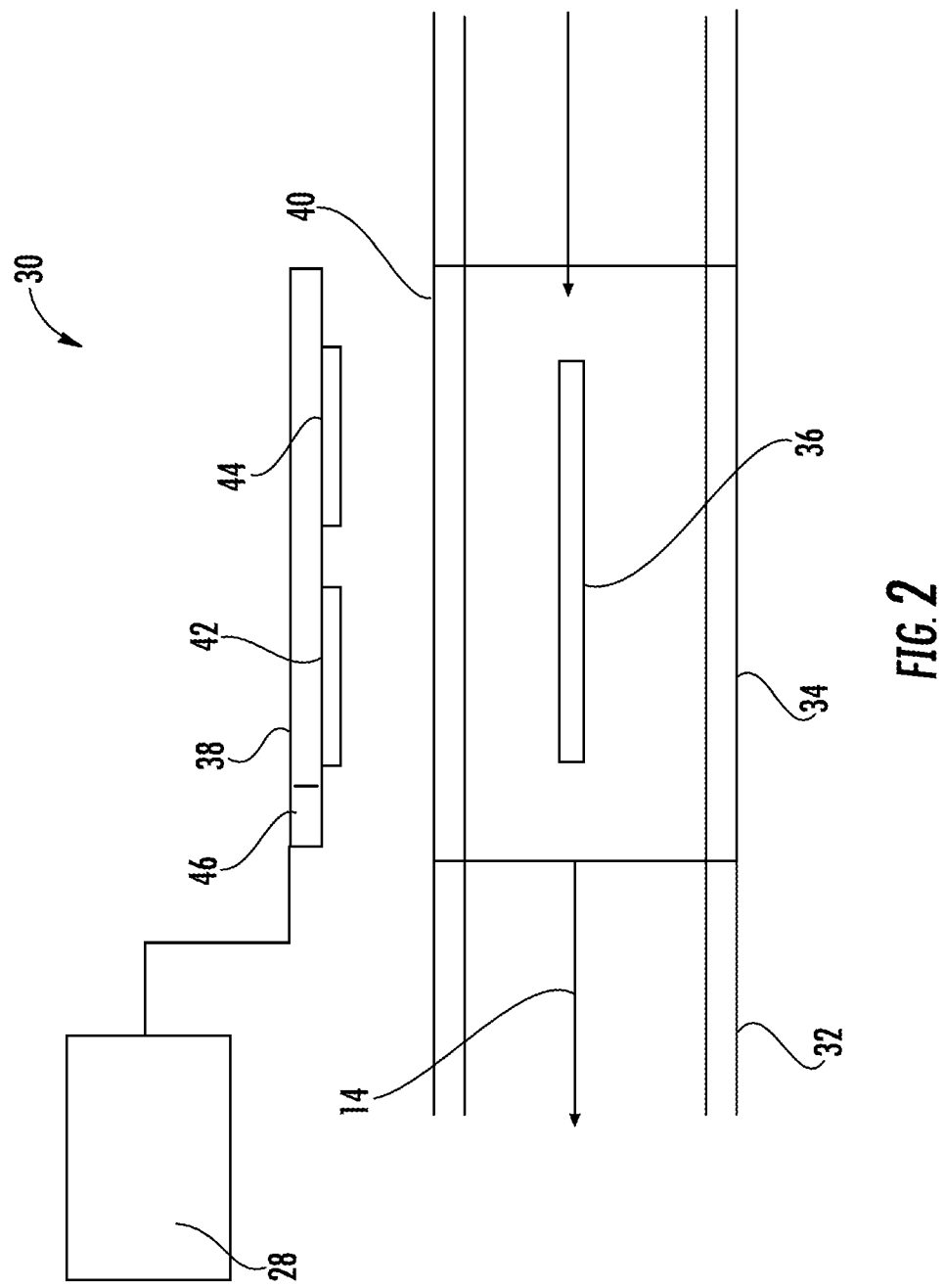
FIG. 2 is a schematic view of an embodiment of a moisture sensing system for a chiller.

Referring now to FIG. 2, the moisture sensor 30 is shown schematically in more detail. The moisture sensor 30 includes a sight glass 34 connected to the refrigerant path 32 such that the refrigerant flows therethrough. The sight glass 34 includes a color change material sample 36 located therein, which is exposed to the refrigerant flowing along the refrigerant path 32. The color change material sample 36 is configured to change color depending on a humidity level of the refrigerant. For example, when exposed to a relatively dry refrigerant stream, the color change material sample 36 is a blue color. When the refrigerant stream humidity exceeds a threshold, the color change material sample 36 is an orange color, and when the refrigerant stream humidity is below, but near the threshold, the color change material sample 36 may be an intermediate color, such as a dark purple. It is to be appreciated that these colors are merely exemplary and other colors may be utilized. Likewise, any type of moisture sensor may be used provided that the sensor changes colors based upon the water content/humidity of the refrigerant.

The moisture sensor 30 further includes a color sensor 38 in visual communication with the color change material sample 36. The color sensor 38 is located outside of a sight glass housing 40 in the embodiment shown in FIG. 2, but it is to be appreciated that in other embodiments the color sensor 38 may be located within the sight glass housing 40. The color sensor 38 includes a solar sensor 42 to sense the color of the color change material sample 36 and a light source 44, for example, a white LED light to illuminate the color change material sample 36 to improve operation of the solar sensor 42. The color sensor 38 further includes circuitry 46 to enable communicating of a digitized signal to the controller 28, which is indicative of the color of the color change material sample 36. In one embodiment, the light source 44 may be omitted. In one embodiment, any type of color sensor 38 may be used so long as the color sensor 38 is capable of detecting a color change in the color change material sample 36.

The controller 28 may be configured to take action based on the digitized signal. For example, if a dark color, such as dark blue is sensed, the refrigerant flow is "dry", in some embodiments indicating a moisture level, or water level, less than 50 part per million. If an intermediate color such as purple is sensed, the refrigerant flow may have a moisture level between about 50 parts per million and 150 parts per million. Caution may be indicated by the controller 28 by illumination of a signal or alarm, such as an amber light, indicating a warning to chiller 10 operators. Further, if an orange color is sensed, indicating a moisture level exceeding 150 parts per million in some embodiments, the controller 28 may indicate a high warning by initiating illumination of a red light, or other alarm to chiller 10 operators. These ranges are merely exemplary and other ranges may be used. The controller 28 may also be configured to take action to correct the moisture level of the refrigerant flow when the sensed color indicates that the moisture level exceeds a selected threshold, for example, activating the purge system 60 and directing flow into the purge system 60 by operation of purge valve 62 to reduce the moisture level of the refrigerant flow. In one embodiment, the selected threshold may be 150 parts per million. In one embodiment, the selected threshold may be greater than or less than 150 parts per million.

The moisture sensor 30 disclosed herein enables automatic diagnosis of the moisture level of the refrigerant without the need for operator intervention. The moisture sensor 30 communicates directly with the controller 28 to initiate warnings and/or other actions, and operates at low cost. Further, there is not direct contact of electrically energized components with the refrigerant.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A moisture sensing system for a refrigerant flow of a heating, ventilation and air conditioning (HVAC) system comprising:
    a moisture sensor including a color change material sample disposed in a refrigerant flow of the HVAC system, the color change material sample configured to change color as an indication of a moisture level of the refrigerant flow; and
    a color sensor in optical communication with the moisture sensor and configured to sense a color of the color change material and communicate the sensed color to an HVAC system controller;
    wherein the moisture sensor is disposed along a main refrigerant circuit of the HVAC system, the main refrigerant circuit including, a compressor, a condenser and an evaporator connected serially, the moisture sensor disposed between the compressor and the evaporator, fluidly downstream of the evaporator;
    wherein the HVAC system includes a purge system configured to purge moisture from the refrigerant flow in which the refrigerant flow is diverted from a condenser of the HVAC system, through the purge system and to the evaporator, the purge system disposed fluidly between the condenser and the evaporator;
    wherein a controller activates the purge system in response to the indicated moisture level exceeding a selected threshold.

2. The moisture sensing system of claim 1, wherein the moisture sensor is disposed inside of a sight glass housing.

3. The moisture sensing system of claim 2, wherein the color sensor is disposed outside of the sight glass housing.

4. The moisture sensing system of claim 1, wherein the color sensor includes a light emitting diode to illuminate the moisture sensor.

5. A heating, ventilation and air conditioning (HVAC) system comprising:
    a main refrigerant circuit including:
        a compressor to compress a flow of refrigerant through a refrigerant pathway;
        a condenser disposed along the refrigerant pathway and in fluid communication with the compressor;
        an evaporator disposed along the refrigerant pathway and in fluid communication with the compressor and the condenser, the compressor, the condenser and the evaporator connected serially; and
    a moisture sensing system disposed along the refrigerant pathway, including:
        a moisture sensor including a color change material sample disposed in the refrigerant pathway and exposed to a refrigerant flow therethrough, the color change material sample configured to change color as an indication of a moisture level of the refrigerant flow; and
        a color sensor in optical communication with the moisture sensor and configured to sense a color of the color change material and communicate the sensed color to an HVAC system controller;
        wherein the moisture sensor is disposed between the compressor and the evaporator, fluidly downstream of the evaporator;
        wherein the HVAC system includes a purge system configured to purge moisture from the refrigerant flow in which the refrigerant flow is diverted from the condenser, through the purge system and to the evaporator, the purge system disposed fluidly between the condenser and the evaporator;
        wherein a controller activates the purge system in response to the indicated moisture level exceeding a selected threshold.

6. The HVAC system of claim 5, wherein the moisture sensor is disposed inside of a sight glass housing.

7. The HVAC system of claim 6, wherein the color sensor is disposed outside of the sight glass housing.

8. The HVAC system of claim 5, wherein the color sensor includes a light emitting diode to illuminate the moisture sensor.

9. The HVAC system of claim 5, wherein the HVAC system controller is configured to take one or more actions based on the sensed color communicated to the HVAC system controller.

10. The HVAC system of claim 9, wherein the one or more actions include initiating an alarm or warning.

11. The HVAC system of claim 9, wherein the one or more actions include initiating a refrigerant flow drying or purge operation via the purge system.

12. A method of operating a heating, ventilation and air conditioning (HVAC) system comprising:
    exposing a color change material sample to a flow of refrigerant;
    sensing a color of the color change material via a color sensor, the color indicative of a moisture level of the flow of refrigerant; and
    communicating the sensed color to an HVAC system controller;
    wherein the moisture sensor is disposed along a main refrigerant circuit of the HVAC system, the main refrigerant circuit including, a compressor, a condenser and an evaporator connected serially, the moisture sensor disposed between the compressor and the evaporator, fluidly downstream of the evaporator;
    wherein the HVAC system includes a purge system configured to purge moisture from the refrigerant flow in which the refrigerant flow is diverted from a condenser of the HVAC system, through the purge system and to the evaporator, the purge system disposed fluidly between the condenser and the evaporator;
    activating the purge system in response to the indicated moisture level exceeding a selected threshold.

13. The method of claim 12, wherein the color sensor is disposed outside of a sight glass housing.

14. The method of claim 12, further comprising illuminating the color change material sample.

15. The method of claim 12, further comprising initiating one or more actions via the HVAC system controller based on the sensed color of the color change material sample.

16. The method of claim 15, wherein the HVAC system controller initiates an alarm or warning based on the sensed color of the color change material sample.

17. The method of claim 15, wherein the HVAC system controller initiates a refrigerant flow drying or purge operation via the purge system based on the sensed color of the color change material.

* * * * *